United States Patent
Bamberg et al.

(10) Patent No.: US 12,518,371 B2
(45) Date of Patent: Jan. 6, 2026

(54) METHOD FOR CLASSIFYING AN ETCH INDICATION OF A COMPONENT

(71) Applicant: MTU Aero Engines AG, Munich (DE)

(72) Inventors: Joachim Bamberg, Dachau (DE); Markus Kolb, Dachau (DE); Marco Hueller, Karlsfeld (DE); Yann Schoebel, Munich (DE)

(73) Assignee: MTU Aero Engines AG, Munich (DE)

( * ) Notice: Subject to any disclaimer, the term of this patent is extended or adjusted under 35 U.S.C. 154(b) by 466 days.

(21) Appl. No.: 17/992,390

(22) Filed: Nov. 22, 2022

(65) Prior Publication Data

US 2023/0162346 A1  May 25, 2023

(30) Foreign Application Priority Data

Nov. 25, 2021 (DE) .......................... 102021130884.4

(51) Int. Cl.
*G06T 7/00* (2017.01)
*G01N 21/88* (2006.01)

(52) U.S. Cl.
CPC .... *G06T 7/001* (2013.01); *G06T 2207/30164* (2013.01)

(58) Field of Classification Search
CPC .................. G06T 7/001; G06T 7/0004; G06T 2207/30164; G06T 2207/10056; G06T 2207/20081; G06T 2207/20084; G01N 2021/8854; G01N 2021/8887; G01N 21/8851
See application file for complete search history.

(56) References Cited

U.S. PATENT DOCUMENTS

| | | | |
|---|---|---|---|
| 6,047,083 A * | 4/2000 | Mizuno | G06T 7/001 382/141 |
| 7,495,758 B2 | 2/2009 | Walton et al. | |
| 2008/0317329 A1* | 12/2008 | Shibuya | G06T 7/0004 382/149 |

(Continued)

FOREIGN PATENT DOCUMENTS

| | | | | |
|---|---|---|---|---|
| CN | 112669307 A * | 4/2021 | ......... | G06F 18/2132 |
| DE | 692 20474 T2 | 2/1998 | | |

(Continued)

OTHER PUBLICATIONS

Chi, Se-Hwan & Shin, Y.-K & Kim, G.-C & Hong, Joo-Heon. Influence of ion-irradiation on hardness change in type 304 stainless steel weldment containing delta($\delta$) ferrite. (2002). Materials Transactions. 43. 627-632. (Year: 2002).*

(Continued)

*Primary Examiner* — Amandeep Saini
*Assistant Examiner* — Emma Rose Goebel
(74) *Attorney, Agent, or Firm* — Davidson Kappel LLC

(57) ABSTRACT

A method (100) for classifying an etch indication (11) of a component (10), the method including the steps of: providing a captured image (13) of the at least one etch indication (11); detecting at least one criterion (15) of the etch indication (11) based on the captured image (13); comparing the determined criterion (15) to at least one criteria data set (16) of etch indications (11) that is stored in a database; and classifying the etch indication (11) into at least one predetermined defect class (D) based on the comparison.

12 Claims, 2 Drawing Sheets

(56) References Cited

U.S. PATENT DOCUMENTS

| | | | |
|---|---|---|---|
| 2009/0218490 A1* | 9/2009 | Suzuki | G06T 7/001 |
| | | | 250/307 |
| 2012/0232841 A1* | 9/2012 | Kush | G01N 21/8851 |
| | | | 702/167 |
| 2017/0108449 A1 | 4/2017 | Wingfield et al. | |
| 2018/0108187 A1 | 4/2018 | Kosubek et al. | |
| 2020/0364906 A1 | 11/2020 | Shimodaira et al. | |
| 2021/0209413 A1 | 7/2021 | Nakago et al. | |
| 2021/0215641 A1 | 7/2021 | Bamberg et al. | |
| 2022/0236197 A1* | 7/2022 | Wang | F01D 21/003 |
| 2023/0060289 A1* | 3/2023 | Henderson | G06Q 10/20 |
| 2024/0233112 A1* | 7/2024 | Zhang | G06T 7/174 |

FOREIGN PATENT DOCUMENTS

| | | |
|---|---|---|
| DE | 694 25822 T2 | 4/2001 |
| DE | 10 2011077670 A1 | 12/2012 |
| DE | 10 2014201273 A1 | 7/2015 |
| DE | 102016219931 A1 | 4/2018 |
| DE | 10 2017006516 A1 | 1/2019 |
| DE | 102018210500 A1 | 1/2020 |
| DE | 102019203796 A1 | 9/2020 |
| DE | 102019209408 A1 | 12/2020 |
| DE | 102021200938 A1 | 8/2022 |
| EP | 0700515 B1 | 9/2000 |
| JP | H01167636 A | 7/1989 |
| WO | WO2020001671 A | 1/2020 |
| WO | WO 2022156873 A1 | 7/2022 |

OTHER PUBLICATIONS

Pfirrmann et al.:"Detecting material defects during turning of DA718 components," Procedia CIRP 108 (2022) 619-623, Jun. 1, 2022.

* cited by examiner

METHOD FOR CLASSIFYING AN ETCH INDICATION OF A COMPONENT

This claims the benefit of German Patent Application DE 102021130884.4, filed Nov. 25, 2021 which is hereby incorporated by reference herein.

The invention relates to a method for classifying an etch indication of a component, and to a use of a component classified using this method.

BACKGROUND

Especially in technologies where acceptable tolerances for flaws are low, objective and reliable diagnosis of defects is essential. It is known to treat surfaces of in particular metallic components with an etching agent to make chemical and/or structural inhomogeneities in the material microstructure (e.g., segregation) visually detectable. Such surfaces are then subjected to a manual visual inspection to identify and interpret so-called "etch indications." Such etch indications may be metallographically prepared to enable assessment and/or classification of a potential defect. Moreover, replicas may be produced to enable examination thereof and to thereby provide a basis for deciding whether the component in question can be put to its intended use or whether, based on the etch indication, it is a bad part that does not meet the quality specifications, and therefore must be disposed of.

SUMMARY OF THE INVENTION

In view of the above, it is an object of the present invention to provide a method for classifying at least one etch indication of a component, which method, in particular, yields reproducible classification results. Another object is to provide a classification-based use of a component having an etch indication.

The present invention provides a method for classifying at least one etch indication of a component, the method including a step of providing at least one captured image of the at least one etch indication; a step of detecting at least one criterion of the etch indication based on the captured image; a step of comparing the at least one determined criterion to at least one criteria data set of etch indications that is stored in a database; a step of classifying the etch indication into at least one predetermined defect class based on the comparison; and a step of classifying the etch indication into at least one predetermined criticality class based on the defect class of the at least one etch indication of the component.

The method enables systematic detection, classification, and evaluation of features. Thus, it is possible to pre-sort or classify etch indications on components into predetermined categories or according to a taxonomy based on objectively assessed criteria in a pre-sorting or classification process which, on the one hand, can be performed in a more precise and more uniform manner, in particular through machine-assisted assessment, and, on the other hand, in a reproducible manner. The classification of the etch indication into at least one predetermined defect class may, for example, also account for additional data relating to the component in question, such as, in particular, a manufacturing history of the component having the etch indication, for example with regard to plastic deformation operations or thermal treatments.

A component is, in particular, a component or element of an assembly adapted for use in a device and may include a metallic material, in particular in the form of an alloy. Such a component may, for example, be a component of a rotor or stator for a turbomachine, or a Class 1 component, in particular a compressor disk or turbine disk for receiving rotor blades, or an integral compressor or turbine blade/disk structure (blisk) for a turbomachine such as an aircraft engine, and thus may be subject to special quality requirements.

An etch indication is in particular a region of a component surface that has been treated using an etching process, which region exhibits an irregularity or inhomogeneity of a structural property in the material of the component, in particular a variation in the microstructure of the component, the irregularity or inhomogeneity appearing in particular as a result of the etching process. The etch indication may, for example, make visible certain indications, such as a local enrichment or depletion of alloying elements, a chemical segregation or mixture separation, as well as an inhomogeneity of alloying elements or inclusions. The presence or occurrence of an etch indication on the component may provide an indication of an impairment of the component. Depending on the morphology of the etch indication or the features thereof, the etch indication may be a sign of, for example, a critical impairment leading to uselessness of the component, or a false indication according to which the component having an etch indication is suitable for its intended use.

A captured image of the etch indication is in particular a picture or graphical representation of the etch indication, such as, for example, a microscopic photograph or light-microscopy image, and may be present in the form of image data. The image may be captured using, for example, a digital magnifier or lens device on the component, and in particular at different illumination angles. Provision may be made to provide a plurality of captured images of an etch indication. The captured images may differ, for example, in the type of illumination of the etch indication or in other imaging conditions, whereby different features of the same etch indication may become visible or discernible. In particular, the captured image shows, in particular in the clearest possible manner, structural properties of the etch indication, such as, for example, grain size, segregation, as well as shape, size and distribution of phases and inclusions in the component material in the region of the etch indication.

A detected criterion is, in particular, a detectable or visually discernible feature of the etch indication and/or of the captured image of the etch indication and may be, for example, a grain size or a delta structure ($\delta$ structure) in a microstructure of the component material at or in the region of the etch indication.

Detection of a criterion or property of the etch indication or of the captured image of the etch indication may be accomplished using an image analysis technique. The detection may include a computer-implemented method for processing an image, in particular in a neural network. For example, visual criteria or features may be extracted from image data using so-called "feature extraction layers" and made available for further processing. Neural networks such as, for example, a convolutional neural network (CNN) are known and can be configured to find a feature or criterion and/or a suitable set of features or criteria in an image and to store the same as a data set, for example in a so-called "feature map."

A comparison of the at least one determined criterion or feature to at least one criteria data set of etch indications that is stored in a database may be performed, in particular, based on pattern recognition and/or image comparison. For example, feature maps so created; i.e., matrices containing information on the visual features of a captured image, may be compared to captured images of etch indications and associated data sets already stored in the database. In this process, the morphology and/or distribution of a criterion or feature may be matched against the data sets stored in the database to identify comparable images. This may also be accomplished using, for example, the or a neural network, and thus by means of an AI model.

On the basis of this comparison, the etch indication is classified, in particular by the neural network, into at least one predetermined defect class, which is in particular stored in the neural network. In this process, the etch indication is in particular classified into a defect class that already includes comparable or similar etch indications.

A defect class is in particular part of a predetermined classification or taxonomy, each defect class being assigned at least one criterion that is used to distinguish or categorize etch indications, depending on, in particular different identified properties and/or morphologies of properties of the etch indication or captured image thereof. A defect class is characterized in particular by a predetermined defect type and thus enables a correlation between a detected criterion or a visual property and the defect type of the etch indication.

A first defect class may include or be assigned to a first defect type or first defect types, such a defect (defect type) of the component being characterized by, for example, a first grain size range which, when present, always leads to rejection of the component. A second defect class may, for example, include a defect type that is characterized by a predetermined deviation from a predetermined delta structure. A third defect class may, for example, include a defect type which constitutes what is called a false indication, whereby an inhomogeneity of the component or of the etch indication is indicated, but this inhomogeneity appears erroneously, or the type of inhomogeneity turns out to be irrelevant to a mechanical stability of the component and thus does not constitute a defect within the meaning of the present disclosure.

Further defect classes may include further defect types, such as so-called "Light Etch Indication (LEI)"-type defects, each of which may include, for example, a grain size range and/or a deviation from a delta structure which, depending on the morphology, can be distinguished in terms of their relevance for an assessment of an etch indication. In this context, it is possible to distinguish the defect types of "moderate LEI," "Clean White Spot (CWS)," "Dirty White Spot (DWS)," and "Non-Metallic Inclusion (NMI)," each of which is characterized by a predetermined morphology and/or distribution of a visual structure appearing in the etch indication or captured image.

Such etch indications categorized in defect classes may require further appraisal or evaluation by test personnel to enable an assessment with respect to the possibility of putting the component to its intended use. Such appraisal may then be performed based on, in particular, the position of the etch indication on the component and/or the morphology of, for example, a coarsening of the microstructure of the component material. In this context, it is usually provided that the etch indication be examined or interpreted by test personnel. For this purpose, it may be provided to display to the test personnel the data underlying the result of the method for classifying the etch indication, in particular the captured image provided, and the at least one determined criterion of the etch indication, as well as the at least one criteria data set of etch indications from the database which criteria data set is used for the comparison.

A criticality class is in particular part of a predetermined classification or taxonomy, each criticality class being assigned at least one defect class. Criticality classes are used to distinguish or categorize etch indications of components which show non-critical defects and thus are in particular more likely to be released for use and etch indications of components which show critical defects and thus are in particular more likely to be unsuitable for use because effects on mechanical properties cannot be ruled out. A further and/or all criticality class(es) may include defect types that require manual assessment by test personnel.

This allows data needed for the assessment of etch indications to be collected and processed in a partially automated manner. The machine-based or automated comparison to previously examined and classified etch indications enables accurate and rapid classification into defect classes in order to make it possible to provide at least a pre-selection of relevant etch indications or components having relevant etch indications.

In an embodiment, the method may include an additional step of etching at least a region of a surface of a component to provide an etch indication. For this purpose, the component may in particular be subjected to a dip-etching treatment and/or wipe-etching treatment to display certain structural properties of a material, in particular a metal, which are not visible, for example after polishing. Inhomogeneities or abnormalities shown in this manner constitute an etch indication which can then be further examined and/or classified or assessed within the framework of the proposed method. A structural property or feature may be, for example, a grain size and/or the shape, size, and distribution of phases in the microstructure of the component material.

In an embodiment, the least one criterion characterizes a morphology and/or distribution of a visual structure of the etch indication. In this context, a visual structure may characterize or be a grain size, a grain boundary, a segregation, or a delta structure of the microstructure of the component material. A morphology is in particular a spatial and/or planar arrangement or a characteristic of a structural inhomogeneity, such as, for example, an associated discoloration or shading. A distribution is in particular a spatial and/or planar extent or arrangement of structural changes relative to one another and/or with respect to a surface of the etch indication. In this way, the assessment or classification can be limited to visually detectable features of the etch indication, which enables an objective comparison of criteria.

In an embodiment, the least one criterion characterizes a contrast of the etch indication which contrast is displayed in the captured image. In this connection, the etch indication exhibits a contrast between the feature or criterion to be examined and other features, and the captured image shows this contrast. The contrast may, for example, be assigned a numerical contrast value to simplify comparison of the criterion to stored data sets and to enable a simplified graphical representation in the form of a diagram. Such a contrast may also be a gradient of a contrast and/or an intensity of a contrast.

Thus, for example, a contrast of an etch indication, which contrast is assessed in terms of its intensity and planar extent by means of an algorithm, can be compared to a contrast of captured images stored in the database. This makes it possible to provide an additional classification parameter by which a quantifiable basis is created for a comparison to existing etch indications.

In an embodiment, the method may include an additional step of outputting a classification into the at least one defect class. This may be accomplished in the form of, for example, a display on a suitable output means such as, for example, a display device or in the form of a data set which may include or includes the detected criteria, in particular those criteria which are or were decisive for the classification of the etch indication into a particular defect class. The data set may include a graphical representation and may be capable of being further processed.

When determining or assessing criteria, it may happen that different sub-regions of an etch indication are each classified into a different defect class, in particular depending on the detected criteria. Such classification of sub-regions may be output, for example, as fractions of the total area of the etch indication in conjunction with the respective defect class(es). For example, 20% of the area fractions of the etch indication may be classified into a first defect class, 30% of the area fractions may be classified into a second defect class, and 50% of the area fractions may be classified into a third defect class. This makes it possible, for example, to simplify interpretation of the etch indication by test personnel.

In an embodiment, the method may include an additional step of outputting additional criteria data sets of the at least one defect class into which the etch indication was classified and/or of outputting a manufacturing history of the component. For example, one or more comparison image(s) may be output from the database, in particular together with an, in particular previously stored, assessment of the etch indication shown in the comparison image. The output of such additional data may be used, for example, as a complement for the selection of an etch indication for metallographic preparation by test personnel and/or for the classification of the etch indication into at least one predetermined defect class.

For example, a numerical contrast value or numerical contrast values of the etch indication or captured image may be output. Such a contrast value may be reduced to a number (e.g., values between 0 and 1) or output in the form of a plot, for example as what is called a surface plot. Contrast values in the region of the etch indication which differ significantly from the background contrast can be illustrated in this manner. Thus, selected comparison images can be displayed with their contrast values and made available to test personnel, in particular together with a previously performed and stored assessment of the etch indication of the comparison image, in order to enable an objective and uniform assessment of etch indications.

In addition, metadata regarding, for example, a manufacturing history of the component may be output. A manufacturing history may include, for example, information of a point-tracking algorithm, in particular in combination with a manufacturing simulation, in order to allow a point on the component to be calculated back to its position in a raw production material. The position in the raw production material may include information as to whether a defect is based on the manufacturing process. Such a manufacturing process may be, for example, a forging process and/or or a casting process. Thus, for example, a defect type or a defect class can be determined even more accurately and be taken into account in a classification step in the form of an addition to a likelihood of a particular defect class.

In an embodiment, the method may include an additional step of outputting the classification into the at least one criticality class. By this means, it is possible to indicate whether a component has one or more uncritical defects and thus can be released for use or whether a component has one or more critical defects and therefore cannot be employed or used.

Thus, a classification or assessment of the criticality class and, in particular, also of a defect class can be output to the test personnel and used to decide whether to keep the component. In addition, comparison images from data sets of the database can be made available along with their associated criticality classification after a metallographic preparation. For example, the test personnel may examine similar etch indications, in particular previously assessed etch indications, and take them into account for the assessment of the object under test or of the classified etch indication of the component.

In an embodiment, the component may be classified into a criticality class, taking into account a weighting of the defect class. The weighting of the defect class may, for example, include or reflect a likelihood of an in particular known effect on the mechanical properties of the component depending on a defect type in order to be able to specify a sequence for an examination by test personnel.

In a further aspect, there is provided a use of a component having at least one etch indication, the use taking place depending on a classification of the etch indication into a criticality class, and the classification of the at least one etch indication of the component being provided using a method described herein. The categorization into critical and uncritical components in accordance with the invention makes it possible to distinguish between components which are suitable for use and components which are unsuitable for use.

The use of such a component, in particular in or on a device, provides the advantage of having verified in a reproducible manner compliance with quality and/or safety standards based on objective criteria. This makes it possible to reduce a risk of failure of the material of the component in question and to increase the operational safety of the component or device.

In an embodiment, a normal intended use of such a component during the operation of a turbomachine takes place depending on the classification of the etch indication of the component. A normal intended use is in particular a use of a component by itself or as a component of a system and/or device in a manner that is customary in the technical field under consideration and in accordance with the applicable specifications and standards. In the case of such use, it is possible, in particular, to verify compliance with such rules and/or standards in conjunction with the previously performed classification of at least one etch indication of the component.

In an embodiment of the use, the component is a component of a rotor for a turbomachine and/or a Class 1 component, in particular a compressor disk or turbine disk for receiving rotor blades, or an integral compressor or turbine blade/disk structure (blisk). By means of a previously performed classification method, it is possible to verifiably prove compliance with high safety requirements for the normal intended use of the component, in particular also for its use in aviation applications.

BRIEF DESCRIPTION OF THE DRAWINGS

Further features, advantages, and possible applications of invention will be apparent from the following description taken in conjunction with the drawings, in which.

DETAILED DESCRIPTION

Figure 1:
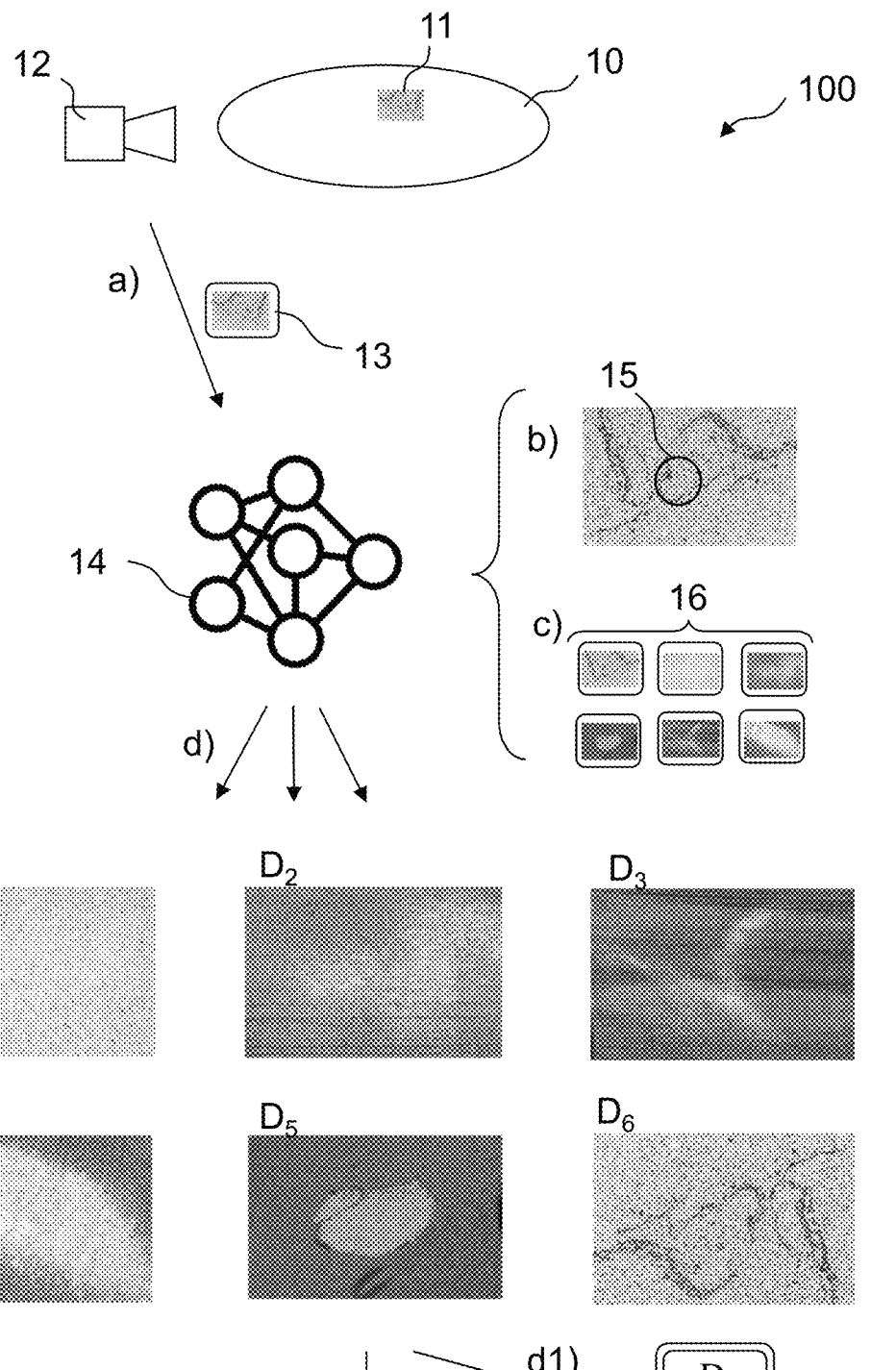
FIG. 1 is a schematic diagram illustrating a sequence of the inventive method for classifying an etch indication of a component having at least one etch indication.

FIG. 1 schematically shows a sequence of an inventive method 100 for classifying an etch indication 11 of a component 10.

In a first step i), at least one surface of a component 10 is etched or subjected to an etching process to provide at least one etch indication 11. In this exemplary embodiment, the illustrated component 10 has an etch indication 11. Using a capture device 12, an image 13 is captured of this etch indication 11, and, in a step a), captured image 13 of etch indication 11 is provided in the form of a data set to a processing unit 14, here a neural network. In other exemplary embodiments, a plurality of images 13 are captured, in particular under different imaging conditions, and/or provided.

In a step b), at least one criterion 15 of etch indication 11 is detected based on the captured image, the at least one criterion characterizing a morphology and/or distribution of a visual structure of etch indication 11. In the exemplary embodiment shown, the at least one criterion characterizes a contrast of etch indication 11 which contrast is displayed in captured image 13.

In a step c), the determined criterion 15 is compared to at least one criteria data set 16 of etch indications 11 that is stored in a database, and, in a step d), etch indication 11 is classified, based on the comparison, into at least one predetermined defect class $D_6$ of a plurality of predetermined defect classes $D_1$ through $D_6$. A first defect class $D_1$ may include a defect type which constitutes what is called a false indication, a second defect class $D_2$ may include a defect type "LEI" which exhibits an increase in grain size, a third defect class $D_3$ may include a defect type "moderate LEI" which exhibits a moderate increase in grain size and an off-spec delta structure, a fourth defect class $D_4$ may include a defect type "Clean White Spot (CWS)", a fifth defect class $D_5$ may include a defect type "Dirty White Spot (DWS)," and a sixth defect class $D_6$ may include a defect type "Non-Metallic Inclusion (NMI)."

In an optional step d1), the classification into defect class $D_6$ is output by means of a display device 17, and, in an optional step d2), there may be output additional criteria data sets of the defect class D into which etch indication 11 was classified, as well as a manufacturing history and a numerical contrast value.

In a step e), etch indication 11 of component 10 is, in this exemplary embodiment, classified into a predetermined criticality class $K_2$ based on the defect class D of etch indication 11 of component 10. A first criticality class $K_1$ may, for example, be assigned first defect types, such as, for example, first defect class $D_1$, second criticality class $K_2$ may include second defect types, such as, for example, second and third defect classes $D_2$, $D_3$, and a third criticality class $K_3$ may include third defect types, such as, for example, defect classes $D_4$, $D_5$, and $D_6$. In this connection, it may be provided that all etch indications 11, or all components 10 having etch indications 11, which are classified into at least one criticality class K be subjected to a manual assessment by test personnel. This classification into criticality class K may also be output in an optional step e1), in particular together with additional criteria data sets of the defect class D into which etch indication 11 was classified, as well as a manufacturing history associated with component 10, and a numerical contrast value or contrast values of etch indication 11 or captured image 13.

Figure 2:
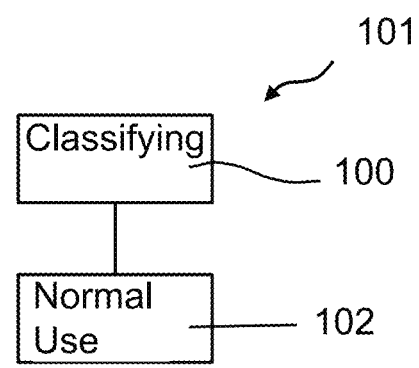
FIG. 2 is a schematic flow chart of a use of a component in accordance with the invention.

FIG. 2 shows a schematic flow chart of a use 101 of an exemplary component 10 having at least one etch indication 11. During use 101, a normal intended use 102 of component 10 takes place during operation of an aircraft engine depending on a classification into a criticality class K, and the classification of component 10 is performed using a method 100 for classifying an etch indication of a component, in particular in accordance with the exemplary embodiment shown in FIG. 1. Components that do not meet certain quality specifications may be disposed of.

LIST OF REFERENCE NUMERALS 10 component
11 etch indication
12 capture device
13 captured image
14 processing unit
15 criterion
16 data set
100 method
normal intended use
D defect class
K criticality class
a) through e), i) steps

What is claimed is:

1. A method for operating a turbomachine, the method comprising:
    etching a component of the turbomachine to provide an etch indication;
    classifying the etch indication of the component, the classifying comprising the following steps:
    a) providing at least one captured image of the etch indication;
    b) detecting at least one criterion of the etch indication based on the captured image;
    c) comparing the at least one determined criterion to at least one criteria data set of previous etch indications stored in a database;
    d) classifying the etch indication into at least one of a plurality of predetermined defect classes based on the comparison, and
    e) classifying the etch indication into one of a plurality of predetermined criticality classes based on the classified defect class of the at least one etch indication of the component, the plurality of predetermined criticality classes including a first criticality class indicating uncritical defects and a second criticality class indicating critical defects; and
    operating the turbomachine after the etch indication is classified into the first criticality class;
    a first defect class of the plurality of predetermined defect classes including false indications;
    a second defect class of the plurality of predetermined defect classes including defects exhibiting an increase in grain size and a third defect class of the plurality of predetermined defect classes including both defects exhibiting an increase in grain size and an off-specification delta structure;
    the first criticality class including the first defect class and the second criticality class including both the second and third defect classes.

2. The method as recited in claim 1 wherein the at least one criterion characterizes a morphology or distribution of a visual structure of the etch indication.

3. The method as recited in claim 2 wherein the at least one criterion characterizes a contrast of the etch indication, the contrast being displayed in the captured image.

4. The method as recited in claim 1 further comprising:
d1) outputting the classification into the one of the plurality of defect classes.

5. The method as recited in claim 1 further comprising:
d2) outputting additional criteria data sets of the at least one defect class into which the etch indication was classified or outputting a manufacturing history.

6. The method as recited in claim 1 further comprising:
e1) outputting the classification into the one of the plurality of criticality classes.

7. The method as recited in claim 1 wherein the classification of the etch indication into one of the plurality of criticality classes takes into account a weighting of the defect class.

8. The method as recited in claim 1 wherein the component is a rotor.

9. The method as recited in claim 1 wherein the component is a compressor disk or turbine disk for receiving rotor blades.

10. The method as recited in claim 1 wherein the component is a turbine blisk.

11. The method as recited in claim 1 wherein a further defect class of the plurality of predetermined defect classes includes a defect type of white spots and a yet further defect class of the plurality of predetermined defect classes includes a defect type of non-metallic inclusions.

12. A method for operating a turbomachine, the method comprising:
etching a component of the turbomachine to provide an etch indication;
classifying the etch indication of the component, the classifying comprising the following steps:
a) providing at least one captured image of the etch indication;
b) detecting at least one criterion of the etch indication based on the captured image;
c) comparing the at least one determined criterion to at least one criteria data set of previous etch indications stored in a database;
d) classifying the etch indication into at least one of a plurality of predetermined defect classes based on the comparison, and
e) classifying the etch indication into one of a plurality of predetermined criticality classes based on the classified defect class of the at least one etch indication of the component, the plurality of predetermined criticality classes including a first criticality class indicating uncritical defects and a second criticality class indicating critical defects; and
operating the turbomachine after the etch indication is classified into the first criticality class;
a first defect class of the plurality of predetermined defect classes including false indications;
a further defect class of the plurality of predetermined defect classes including a defect type of white spots and a yet further defect class of the plurality of predetermined defect classes includes a defect type of non-metallic inclusions;
the first criticality class including the first defect class and the second criticality class including both the further and yet further defect classes.

* * * * *